United States Patent
Okouchi et al.

(10) Patent No.: US 9,527,200 B2
(45) Date of Patent: Dec. 27, 2016

(54) ELECTRIC POWER TOOL

(71) Applicant: MAKITA CORPORATION, Anjo-shi, Aichi (JP)

(72) Inventors: Katsumi Okouchi, Anjo (JP); Yohei Ogino, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 524 days.

(21) Appl. No.: 14/065,931

(22) Filed: Oct. 29, 2013

(65) Prior Publication Data

US 2014/0116738 A1 May 1, 2014

(30) Foreign Application Priority Data

Nov. 1, 2012 (JP) ................................ 2012-241648

(51) Int. Cl.
| | | |
|---|---|---|
| *B25F 5/02* | (2006.01) | |
| *B25F 3/00* | (2006.01) | |
| *B23Q 9/00* | (2006.01) | |
| *B27C 5/10* | (2006.01) | |
| *B25F 5/00* | (2006.01) | |

(52) U.S. Cl.
CPC ............... *B25F 3/00* (2013.01); *B23Q 9/0028* (2013.01); *B25F 5/02* (2013.01); *B27C 5/10* (2013.01); *B23B 2231/2081* (2013.01); *B23B 2260/078* (2013.01); *B25F 5/003* (2013.01)

(58) Field of Classification Search
CPC . B23Q 9/0028; B23Q 9/0035; B23Q 11/0046; B25F 3/00; B25F 5/00; B25F 5/02; B25F 5/003; B25F 5/021; B25F 5/026; B25F 5/029; B23B 2231/2081; B23B 2260/078; B23B 49/008; B25C 5/10; B23C 1/20

USPC .......... 173/132, 46, 213, 217, 171; 409/137, 409/138, 180, 182, 210, 218; 279/143, 150; 144/117.3, 134.1, 136.95, 154.5; 408/241 S

See application file for complete search history.

(56) References Cited

U.S. PATENT DOCUMENTS

| | | | | |
|---|---|---|---|---|
| 1,260,698 A | * | 3/1918 | Moore et al. ......... | B25B 13/488 81/55 |
| 2,988,119 A | * | 6/1961 | Damijonaitis ............ | B27C 5/10 144/134.1 |
| 3,499,223 A | * | 3/1970 | Lieb ....................... | A61C 1/141 279/53 |
| 4,193,327 A | * | 3/1980 | Lares ..................... | A61C 1/145 81/55 |

(Continued)

FOREIGN PATENT DOCUMENTS

JP       2003-272728 A       9/2003

OTHER PUBLICATIONS

Cutout Tool 3706 Instruction Manual, Feb. 2006, pp. 1-16, Makita Corporation.

(Continued)

*Primary Examiner* — Scott A. Smith
(74) *Attorney, Agent, or Firm* — Oliff PLC

(57) ABSTRACT

A shoe attached to a shoe attachment portion includes a spanner portion. As the shoe can be separated from a tool main body of the cutout tool, the shoe can be used as a spanner. The shoe can function as the spanner for replacing a bit in a bit attachment mechanism. In addition, the shoe has its original function of the shoe by which a protrusion amount of the bit can be adjusted. Since the shoe is attached to the shoe attachment portion and held by the tool main body, it turns out that the spanner can be prepared for use with the cutout tool.

9 Claims, 8 Drawing Sheets

(56) References Cited

U.S. PATENT DOCUMENTS

| | | | | | |
|---|---|---|---|---|---|
| 4,313,725 | A * | 2/1982 | Lieb | ............................ | A61C 1/145 |
| | | | | | 433/126 |
| 5,829,931 | A * | 11/1998 | Doumani | .................... | B23B 49/006 |
| | | | | | 144/251.1 |
| 5,902,080 | A * | 5/1999 | Kopras | ........................ | B25F 5/02 |
| | | | | | 144/136.95 |
| 6,244,796 | B1 * | 6/2001 | Schuebel | .................. | B23B 49/008 |
| | | | | | 144/136.95 |
| 6,350,087 | B1 * | 2/2002 | Berry | ........................ | B23B 31/001 |
| | | | | | 144/154.5 |
| 6,443,676 | B1 * | 9/2002 | Kopras | ...................... | B25F 5/003 |
| | | | | | 144/136.95 |
| 6,447,221 | B1 * | 9/2002 | Chen | ........................ | B23B 49/006 |
| | | | | | 408/113 |
| 6,506,006 | B2 * | 1/2003 | Lui | ............................ | B25F 5/026 |
| | | | | | 144/136.95 |
| 6,679,659 | B1 * | 1/2004 | Lasch | ...................... | B23Q 1/015 |
| | | | | | 409/137 |
| 6,725,892 | B2 * | 4/2004 | McDonald | .............. | B25F 5/003 |
| | | | | | 144/136.95 |
| 6,755,597 | B2 * | 6/2004 | Bergner | .................... | B23Q 7/10 |
| | | | | | 144/136.95 |
| 6,835,030 | B2 * | 12/2004 | Pozgay | .................. | B23Q 9/0035 |
| | | | | | 144/136.95 |
| 7,131,180 | B2 * | 11/2006 | Kopras | ...................... | B25F 3/00 |
| | | | | | 144/136.95 |
| 7,165,920 | B2 * | 1/2007 | Baber | ........................ | B23C 1/20 |
| | | | | | 144/117.3 |
| 7,232,280 | B2 * | 6/2007 | Bernardi | .............. | B23Q 9/0028 |
| | | | | | 144/136.95 |
| 7,344,141 | B2 * | 3/2008 | Schnell | .................. | B23B 31/201 |
| | | | | | 279/150 |
| 7,451,791 | B2 * | 11/2008 | Cooper | ...................... | B25F 5/02 |
| | | | | | 144/136.95 |
| 7,552,749 | B2 * | 6/2009 | Kageler | .................... | B27C 5/10 |
| | | | | | 144/136.95 |
| 7,677,281 | B2 * | 3/2010 | Baker | ........................ | B23C 1/20 |
| | | | | | 144/136.95 |
| 8,545,143 | B2 * | 10/2013 | Liu | ............................ | B27C 5/10 |
| | | | | | 144/136.95 |
| 2003/0029623 | A1 * | 2/2003 | Kopras | ................ | B25H 1/0078 |
| | | | | | 173/1 |
| 2003/0223836 | A1 * | 12/2003 | Pozgay | ................ | B23Q 9/0035 |
| | | | | | 409/182 |
| 2005/0200087 | A1 * | 9/2005 | Vasudeva | ................ | B25F 3/00 |
| | | | | | 279/143 |
| 2011/0229283 | A1 * | 9/2011 | Kato | ........................ | B25F 5/021 |
| | | | | | 409/182 |

OTHER PUBLICATIONS

Mar. 29, 2016 Office Action issued in Japanese Patent Application No. 2012-241648.

* cited by examiner

ELECTRIC POWER TOOL

This application claims priority to Japanese patent application serial number 2012-241648, the contents of which are incorporated herein by reference.

BACKGROUND OF THE INVENTION

Field of the Invention

The present invention relates to an electric power tool in which a tool tip is attached to an output shaft.

Description of the Related Art

An electric power tool that is referred to as a dust-proof board trimmer or a cutout tool used in a processing operation such as cutting of a gypsum board is well known (for example, refer to "Dust-proof Board Trimmer Model 3706 User Manual (Cutout Tool 3706 Instruction Manual)" published by Makita Corporation in February 2006). This type of electric power tool generally includes a driving motor that generates a rotary driving force, and an output spindle (output shaft) that is rotated according to the rotating force of the driving motor. An attachment mechanism to which a processing bit (tool tip) is attached is arranged at a tip of the output spindle. A bit that is selected in accordance with a processing such as the above-described cutout processing is attached to the attachment mechanism. The attachment mechanism is configured in such a manner that various types of bits can be attached for replacement. In general, this type of attachment mechanism is configured to be fastened with a nut. Such a fastening nut can be loosened or tightened with a spanner.

It is desired that the spanner be used with respect to a nut in another electric power tool.

However, if a user has to always prepare a spanner for the electric power tool, the user will be burdened with the preparation and management of the spanner. Thus, there is a need in the art to reduce the burden of ready-to-use preparation and management of the spanner.

The present invention provides an electric power tool in which a tool tip is attached to an output shaft without having to increase the number of components of the electric power tool to be equipped such that the burden of ready-to-use preparation and management of required tools can be reduced for a user.

SUMMARY OF THE INVENTION

According to a first aspect of the present invention, there is provided an electric power tool that includes a motor, a housing that accommodates the motor, and a tool tip that is driven by the motor, in which a member that has at least two different functions is directly or indirectly held by the housing. According to the electric power tool of the first aspect of the present invention, the functioning as a tool that enables the replacement of the tool tip can be set as one of the functions of the member held by the housing. In addition, the functioning as a shoe (contact member) that adjusts, for example, a protrusion amount of the tool tip can be set as one of the functions of the member held by the housing. Herein, the member that has the two functions is held by the housing, and is prepared to be ready for use in the electric power tool. Accordingly, the member that has the function of a replacement tool for the tool tip can have the function as a part of the electric power tool. Accordingly, without having to increase the number of components of the electric power tool to be equipped, a user's burden in preparing a ready-to-use tool can be reduced.

According to a second aspect of the present invention, there is provided an electric power tool that includes a motor, a housing that accommodates the motor, a tool tip holding unit that is driven by the motor and can hold a tool tip, and a contact member that includes a contact portion that can be in contact with a workpiece and that is directly or indirectly held by the housing in which the contact member is configured to enable the tool tip holding unit to perform an operation with regard to the holding of the tool tip. According to the electric power tool of the second aspect of the present invention, the contact member enables the operation of holding the tool tip with respect to the tool tip holding unit. Accordingly, the contact member has two functions: one being the function of being in contact with the workpiece in the contact portion and the other being the function of operating the tool tip holding unit with regard to the holding of the tool tip. Accordingly, the member that has the function as the tool that operates the tool tip holding unit when the tool tip is replaced can be a part of the electric power tool that has the function of being in contact with the workpiece in the contact portion. Accordingly, the member that has the function as a tool that replaces the tool tip can have the function as a part of the electric power tool, and thus the tool management burden can be reduced.

According to a third aspect of the present invention, there is provided an electric power tool that includes a motor, a housing that accommodates the motor, an output shaft that is driven by the motor, a nut that rotates with respect to the output shaft to affix a tool tip, and a contact member that includes a contact portion that can be in contact with a workpiece and that is directly or indirectly held by the housing, in which the contact member is provided with a spanner portion that can rotate the nut. According to the electric power tool of the third aspect of the present invention, the contact member is provided with the spanner portion that can rotate the nut. Herein, the affixing or releasing of the tool tip is performed by rotating the nut with respect to the output shaft. Accordingly, the nut can be rotated by the contact member to affix the tool tip with respect to the output shaft. Accordingly, the contact member equipped in the electric power tool can have the function as a tool for replacing the tool tip, and thus the tool management burden can be reduced.

In the electric power tool of another aspect of the present invention, the spanner portion is located on a rear end side that is opposite to a front end side where the contact portion of the contact member is provided. According to the electric power tool of the above aspect of the present invention, since the spanner portion is located on the rear end side which is opposite to the front end side where the contact portion of the contact member is provided, the contact portion and the spanner portion may be provided without mutual interference. Accordingly, the contact portion can be fully designed to serve as intended while the spanner portion can be fully designed to serve as a spanner.

In the electric power tool of another aspect of the present invention, the contact portion includes a surface that extends in a direction perpendicular to a longitudinal direction of the electric power tool. According to the electric power tool of the above aspect of the present invention, since the contact portion includes the surface that extends in the direction perpendicular to the longitudinal direction of the electric power tool, the contact portion can be in surface contact with the workpiece by moving the electric power tool forward. Accordingly, the contact portion may be in contact with the workpiece in a stable manner. Also, the contact portion provided in this manner may function as a hand grip portion during the use of the spanner portion.

In the electric power tool of another aspect of the present invention, the contact member includes a first contact portion that is in contact with a surface of the workpiece, and a second contact portion that is in contact with a lateral surface of the workpiece in a condition where the first contact portion is in contact with the workpiece, and the spanner portion is provided in the second contact portion. According to the electric power tool of the above aspect of the present invention, the function as the spanner is provided in the second contact portion and the function as the contact portion is provided in the first contact portion. In this way, the above-mentioned tool management burden can be reduced.

DESCRIPTION OF THE PREFERRED EMBODIMENTS

Each of the additional features and teachings disclosed above and below may be utilized separately or in conjunction with other features and teachings to provide an electrical power tool. Representative examples of the present teaching, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

Figure 1:
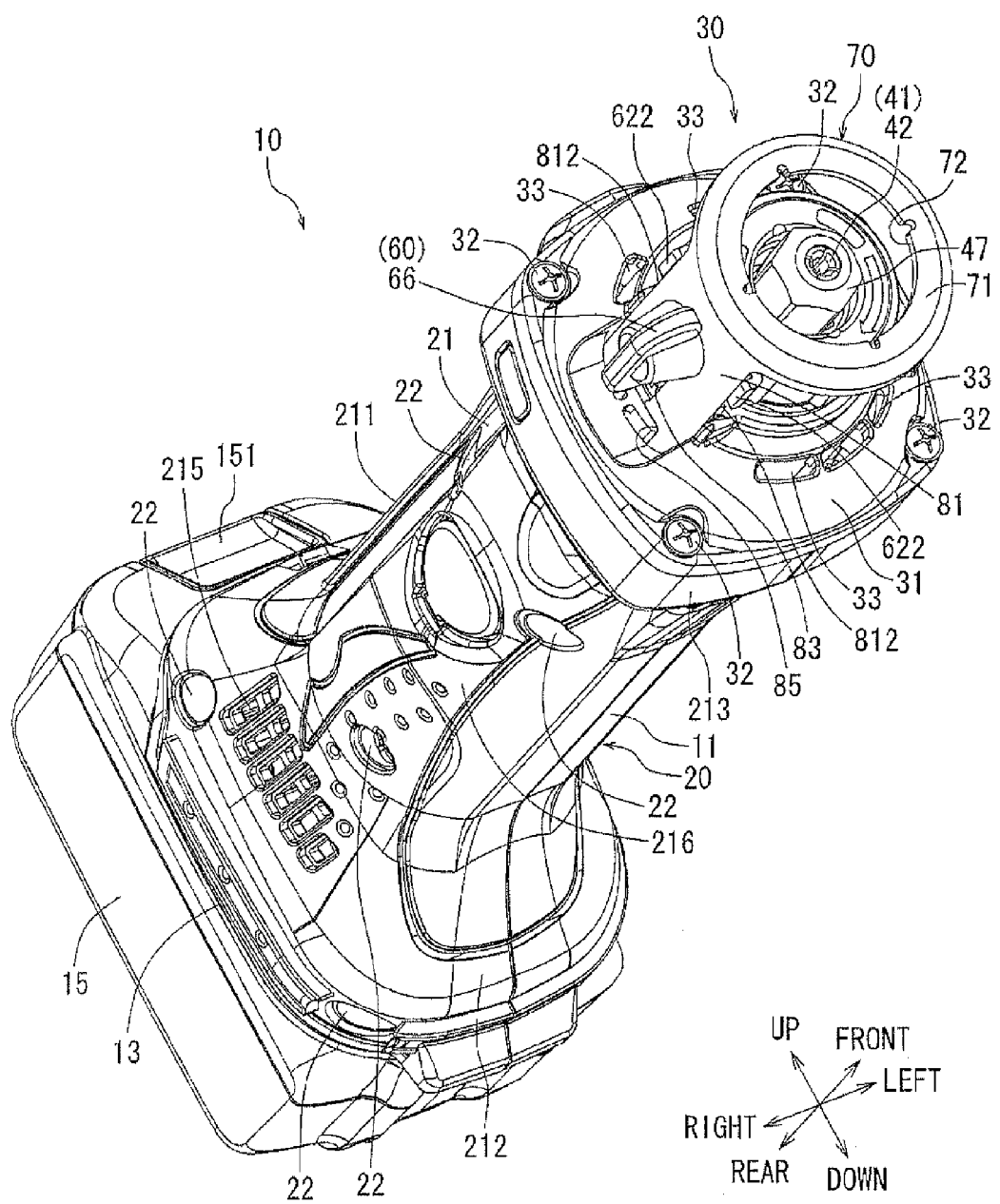
FIG. 1 is an external perspective view showing a cutout tool.
Figure 2:
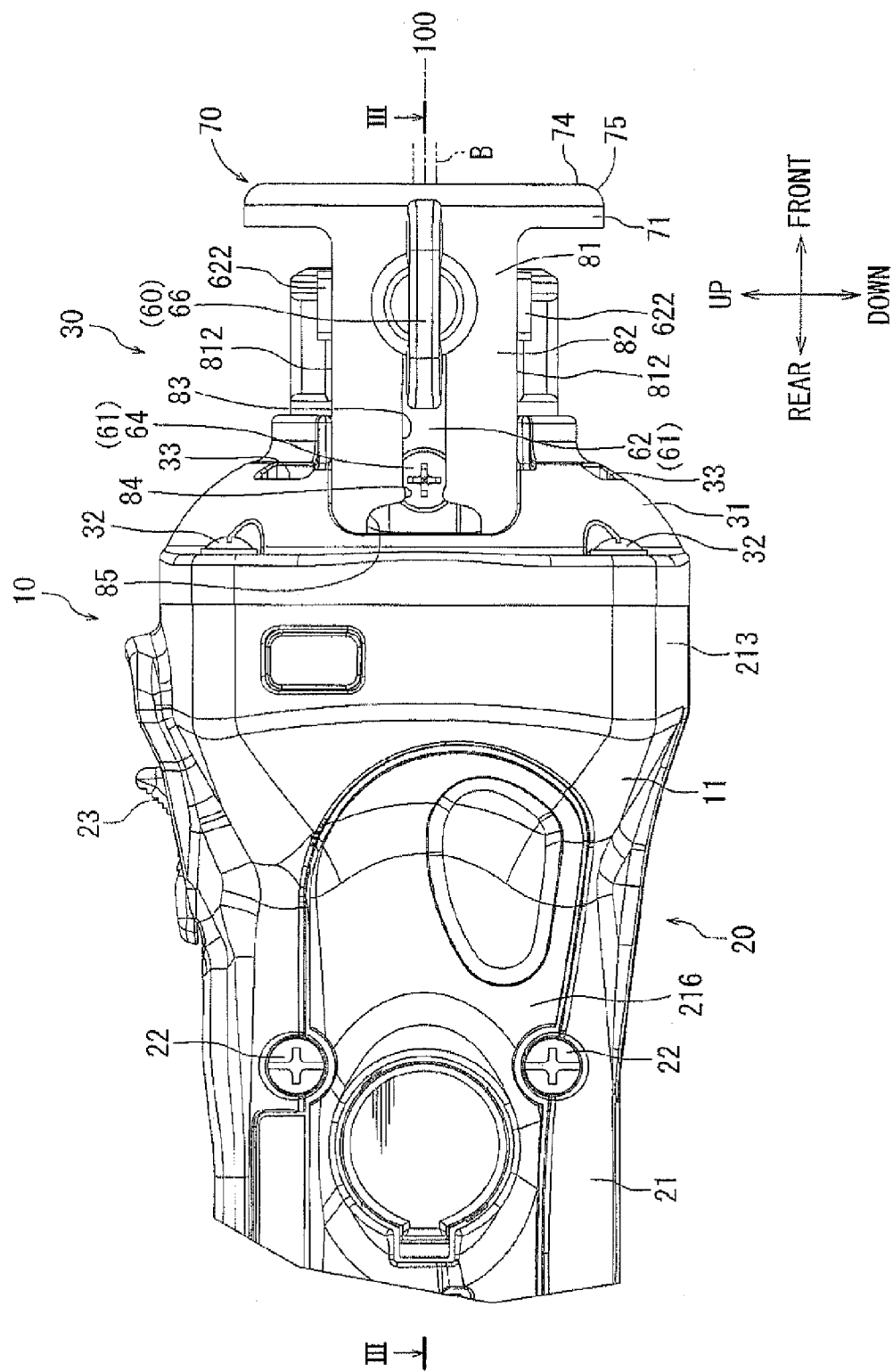
FIG. 2 is an enlarged side view showing the cutout tool.
Figure 3:
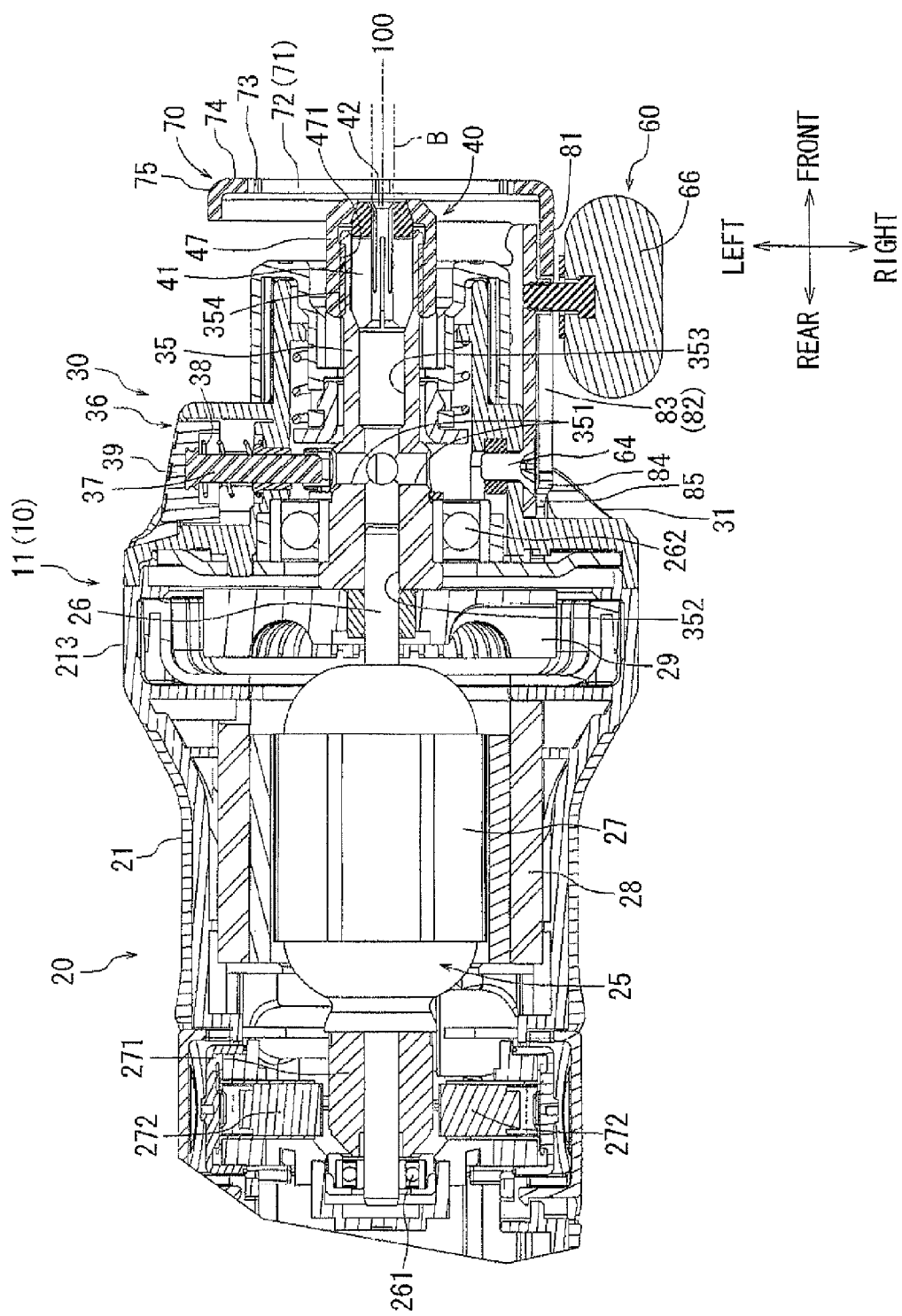
FIG. 3 is an internal cross-sectional view showing an internal structure taken along line III-III of FIG. 2.
Figure 4:
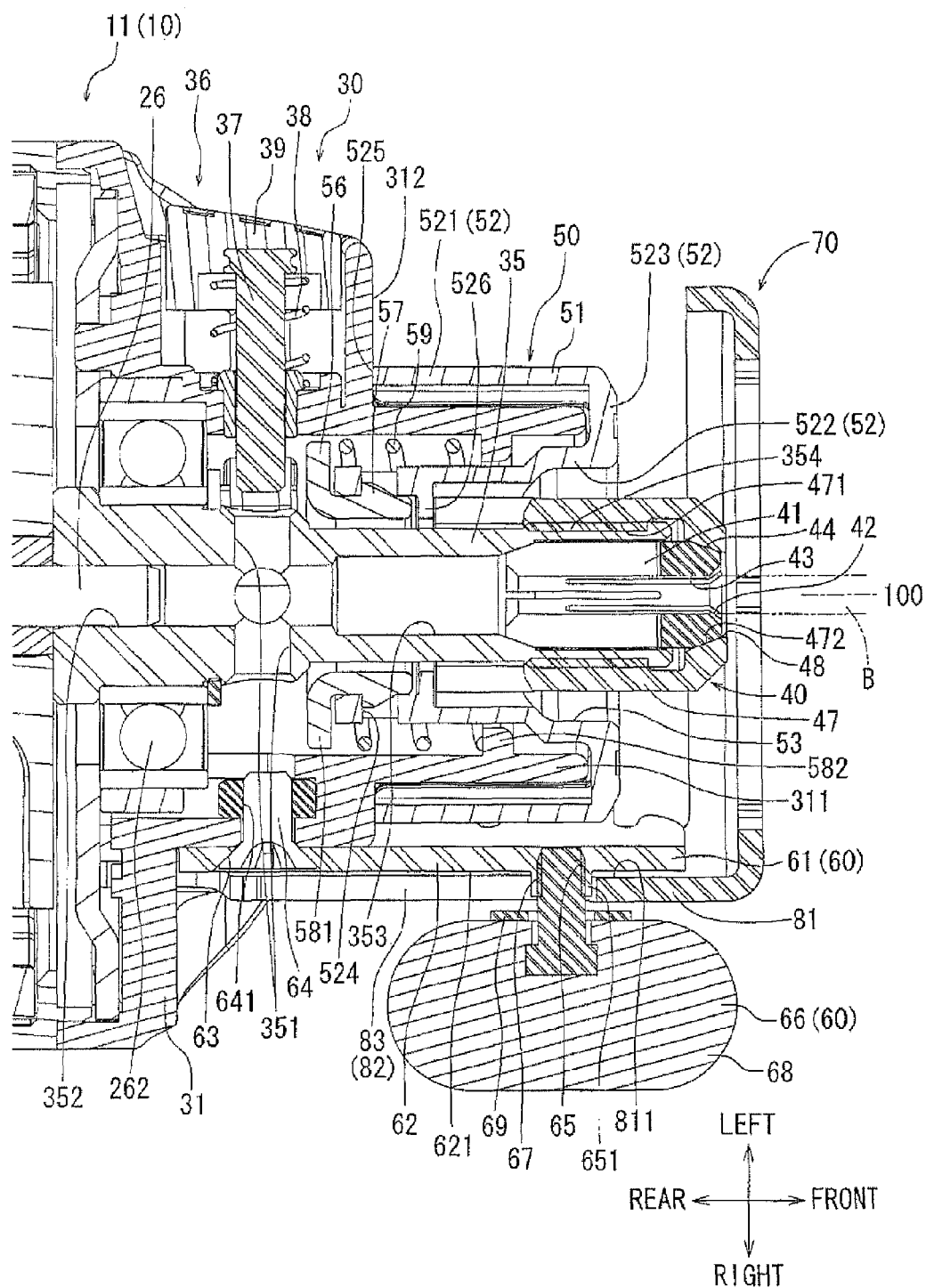
FIG. 4 is an enlarged internal cross-sectional view showing an output shaft support unit of FIG. 3.

Hereinafter, an embodiment of an electric rotary tool (electric power tool) according to the present invention will be described. The electric rotary tool that will be described hereinafter is a hand-held electric power tool referred to as a cutout tool which is used in a processing operation such as the cutting of a gypsum board. The cutout tool will be described referring to FIGS. 1 to 4. FIG. 1 is an external perspective view of a cutout tool 10. FIG. 2 is an external side view of approximately the front half of the cutout tool 10. FIG. 3 is a cross-sectional view showing an internal structure of the cutout tool 10 taken along line III-III of FIG. 2. FIG. 4 is an enlarged internal cross-sectional view showing an output shaft support unit 30 of FIG. 3. The cutout tool 10 is a hand-held type electric power tool which a user can grip with a hand when using the tool 10. Also, the cutout tool 10 is an electric rotary tool that rotates an output shaft 35 according to the rotation of a built-in brush motor 25 (refer to FIG. 3). As shown in FIG. 1, the cutout tool 10 substantially includes a tool main body 11, a rechargeable battery 15, and a shoe 70. For the sake of clarity in the description of the cutout tool 10 below, the up-down, front-back, and left-right directions of the cutout tool 10 are defined as shown in the drawings.

Hereinafter, the tool main body 11 will be described. As shown in FIG. 3, the tool main body 11 includes a driving force generation unit 20 that generates a driving force, and the output shaft support unit 30 that supports the output shaft 35. The driving force generation unit 20 is located such that it extends from a rear portion to a middle portion of the tool main body 11. The driving force generation unit 20 converts the electric power supplied mainly from the rechargeable battery 15 to a rotary driving force. The output shaft support unit 30 is located in a front portion of the tool main body 11. The output shaft support unit 30 supports the output shaft 35 in a rotatable manner. The output shaft 35 holds a bit B, which is shown in FIG. 2, and the rotary driving force is output. The bit B is selected according to the processing aspect of a workpiece. The bit B corresponds to a tool tip according an embodiment of to the present invention driven by the brush motor 25.

The driving force generation unit 20 includes various components, including the brush motor 25 accommodated in a motor housing 21. The motor housing 21 is formed of molded resin divided in half in the left and right directions. As shown in FIG. 1, the combined state of the motor housing 21 is maintained by five screwing portions 22. The motor housing 21 is also used as a grip portion 211 that a used can grip with a hand at an intermediate area thereof. At a rear side of the grip portion 211, there is formed a grip end portion 212. An outer circumferential length of the grip end portion 212 is longer than that of the grip portion 211. That is, the grip end portion 212 is formed similar to a baseball bat. A rear end of the grip end portion 212 is formed as a battery mounting unit 13 on which the rechargeable battery 15 is mounted. The rechargeable battery 15 that is mounted on the battery mounting unit 13 is a power source for the cutout tool 10. The rechargeable battery 15 is charged with a corresponding charger, which is not shown herein. The rechargeable battery 15 is mounted in such a manner as to be slid downward from above with respect to the battery mounting unit 13 provided in the rearmost portion of the tool main body 11. The rechargeable battery 15 is provided with a push button 151. While the push button 151 is pushed, a locked state for the mounting of the rechargeable battery 15 with respect to the battery mounting unit 13 can be released, and the rechargeable battery 15 can be separated from the battery mounting unit 13.

Air inlets 215 that communicate with the outside of the motor housing 21 are provided at an approximate boundary portion between the grip portion 211 and the grip end portion 212. A plurality of rectangular windows are provided to form the air inlets 215. The air inlets 215 are opened so as to take outside air into the motor housing 21 by a blower fan 29 (refer to FIG. 3) which will be described later. The outside air that is taken in through the air inlets 215 passes through the motor housing 21 and then emitted out of an outlet 33 (refer to FIG. 1) which is provided on a front surface of the output shaft support unit 30.

At a front side of the grip portion 211, there is formed a front connection portion 213. At the front connection portion 213, output shaft support unit 30 is connected to the motor housing 21, as will be described later. As is the case with the grip end portion 212, the outer circumferential length of the front connection portion 213 is longer than that of the grip portion 211. Accordingly, the feeling of the grip felt by a user when the grip portion 211 is held with a hand may be improved by the difference between the outer circumferential lengths. Also, as shown in FIG. 1, an appropriate anti-slip covered portion 216 is provided on an outer exposed surface of the grip portion 211. The anti-slip covered portion 216 is formed of thermoplastic elastomer (TPE) integrally molded with the motor housing 21.

As shown in FIG. 3, the blower fan 29 is mounted on an inner circumferential side of the front connection portion 213. The blower fan 29 sends air forward from the back of the motor housing 21. The air is sent to a controller (not shown), a switch main body (not shown), the brush motor 25, and the blower fan 29, and into the motor housing 21 by the blower fan 29. The functions of the controller, which is not shown herein, include the controlling of the electric power supply from the rechargeable battery 15. The functions of the switch main body, which is not shown herein, include an ON-OFF function using a front-back sliding operation of a slide switch 23 which is exposed outside the motor housing 21 shown in FIG. 2. Specifically, in a case where the slide switch 23 is slid to a forward side, the switch main body, which is not shown herein, is set to an ON state and the ON input signal is transmitted to the controller.

The brush motor 25 has the same configuration as brush motors that are commonly used. The brush motor 25 includes a motor shaft 26, a rotor 27, a commutator 271, brushes 272, and a stator 28. A rear end side of the motor shaft 26 is rotatably supported by a rear side bearing 261. The rear side bearing 261 is fixedly supported by the motor housing 21. A front end side of the motor shaft 26 is rotatably supported by a front side bearing 262. The front side bearing 262 is fixedly supported by an output side housing 31. The front side bearing 262 supports the motor shaft 26 via the output shaft 35 which is press fit-connected. The rotor 27 is provided on an outer circumference of the motor shaft 26. The motor shaft 26 functions as an axis of rotation of the rotor 27. The commutator 271 is provided in a rear portion of the rotor 27. The brushes 272 are provided on an outer circumference of the commutator 271. The stator 28 is provided around the rotor 27. The stator 28 is affixed to the motor housing 21. The blower fan 29 is attached to a front side portion of the motor shaft 26. The blower fan 29 is a centrifugal fan that rotates according to the rotation of the motor shaft 26, and causes the air to flow forward from the back in the motor housing 21. The air is taken in from the above-described air inlets 215 and emitted out of the outlet 33 by the blower fan 29. During this process, the air passes through the motor housing 21 and cools the controller (not shown), the switch main body (not shown), and the brush motor 25.

Next, the output shaft support unit 30 placed on a front side of the driving force generation unit 20 will be described. As shown in FIG. 3, the output shaft support unit 30 includes a front side portion of the tool main body 11. The output shaft support unit 30 includes the output shaft 35 that is rotated with the bit B being held in place. As shown in FIG. 4, the output shaft support unit 30 includes the output side housing 31, the output shaft 35, and a bit attachment mechanism 40. As shown in FIG. 1, the output side housing 31 that forms an outer housing of the output shaft support unit 30 is screwed to a front end surface of the motor housing 21 with four screw members 32 placed at four corners. The output side housing 31 is formed of an integrally molded metallic molding material. A rear portion and a front portion of the output side housing 31 have an open shape. The motor shaft 26 is put into the output side housing 31 from a rear side. As shown in FIG. 1, the outlet 33 is provided on a front surface of the output side housing 31. The air is emitted out of the outlet 33 by the blower fan 29. The air emitted out of the outlet 33 can be directed to a shoe main body 71 which is placed on a front side of the output shaft support unit 30. That is, the air emitted out of the outlet 33 is directed to the workpiece that is processed by the bit B.

As shown in FIG. 3, a rear end fitting hole 352 is provided at a rear end of the output shaft 35, and a front end fitting hole 353 is provided at a front end thereof. The motor shaft 26 is press-fitted into the rear end fitting hole 352 so as to be integrated with the output shaft 35. Further, an insertion member 41, which will be described later, is press-fitted into the front end fitting hole 353. A male screw portion 354, which is cut into a male screw shape, is provided on an outer circumferential surface of the output shaft 35 into which the insertion member 41 is press-fitted. A female screw portion 471 of a nut member 47, which will be described later, is screwed to the male screw portion 354. In this manner, the output shaft 35 that is integrated with the motor shaft 26 as well as the insertion member 41 is supported by the front side bearing 262.

A shaft lock mechanism 36 is provided on a left side of the output shaft 35 in the output side housing 31. The shaft lock mechanism 36 fixes the output shaft 35 when the bit B is attached to the bit attachment mechanism 40 that will be described later. The shaft lock mechanism 36 includes a fixing pin body 37 and a biasing spring 38. The fixing pin body 37 is inserted into one of four fixing holes 351 provided in the output shaft 35, and prevents movement of the output shaft 35 in the rotational direction. Accordingly, the fixing pin body 37 has a pin shape to be movable along the radial direction of rotation of the output shaft 35. The biasing spring 38 biases the fixing pin body 37 in the opposite direction to the direction of insertion into the fixing hole 351. A push cover 39 is attached to a portion of the fixing pin body 37 which is exposed on the outside.

Next, the bit attachment mechanism 40 provided at a tip of the above-described output shaft 35 will be described. The bit attachment mechanism 40 corresponds to a tool tip holding unit according to an embodiment of the present invention which is driven by the brush motor 25 and can hold the bit B.

In the bit attachment mechanism 40, the bit B is attached to the output shaft 35. The bit attachment mechanism 40 includes the insertion member 41 and the nut member 47. The nut member 47 corresponds to a fastening member according to an embodiment of the present invention. The insertion member 41 is press-fitted into the front end fitting hole 353 of the output shaft 35. The insertion member 41 is inserted in such a manner as to be capable of holding the bit B such that the bit B is placed on an axis of rotation 100 of the output shaft 35. An opening 42 is provided in the insertion member 41 such that the bit B can be inserted into a front end thereof. The inner circumferential diameter of the insertion member 41 can be reduced such that the bit B inserted into the insertion member 41 is held in place. In more detail, four slits 43 extending in the direction of the axis of rotation 100 are provided at regular intervals in the insertion member 41. The insertion member 41 has four slits 43 in the shape of four split claws that can be moved to the inner and outer circumferential sides. A tapered portion 44 that has a tapered shape is provided in the vicinity of a front end on an outer circumferential surface of the insertion member 41.

The nut member 47 is placed on an outer circumference of the above-described insertion member 41. An opening 48 into which the bit B is inserted is provided at a front end of the nut member 47. The female screw portion 471 that is formed to be a female screw shape is provided on an inner circumferential surface of the nut member 47. The female screw portion 471 is screwed along with the male screw portion 354 provided on the outer circumferential surface of the output shaft 35. A reduced diameter portion 472 that has the same shape of inclination as the tapered portion 44 described above is provided in the vicinity of a front end of an inner circumferential surface of the nut member 47. The reduced diameter portion 472 may or may not come into contact with the tapered portion 44 of the insertion member 41 described above. It depends on the screwing position of the female screw portion 471 with respect to the male screw portion 354. When the nut member 47 is further screwed in the fastening direction with respect to the output shaft 35 in a state where the reduced diameter portion 472 is in contact with the tapered portion 44, the reduced diameter portion 472 pushes the tapered portion 44 of the insertion member 41 to an inner circumferential side. Then, the inner circumferential diameter of a tip of the insertion member 41 is reduced, and an inner circumferential surface of the insertion member 41 pushes an outer circumferential surface of the bit B.

In other words, the insertion member 41 firmly holds the bit B by pushing the outer circumferential surface of the bit B inserted into the opening 42. In contrast, when the nut member 47 is unscrewed from the insertion member 41, the inner circumferential diameter of the insertion member 41 described above returns to an original inner circumferential diameter. At this time, the reduced diameter portion 472 of the nut member 47 does not push the tapered portion 44 to the inner circumferential side. Also, the inner circumferential surface of the insertion member 41 does not push the outer circumferential surface of the bit B. In this manner, the bit B that is inserted into the inner circumferential side of the insertion member 41 is not held by the insertion member 41. In this way, the bit B can be removed from the insertion member 41. The nut member 47 has a hexagonal columnar shape, as is the case with a nut that is commonly used. In other words, the nut member 47 has a hexagonal-shaped outer circumference when viewed from the front, and thus can be turned by a spanner which is commonly used.

On an outer circumferential side of the bit attachment mechanism 40 described above, there is provided an operation mechanism 50 to operate the bit attachment mechanism 40. The operation mechanism 50 is provided on the front portion of the output side housing 31. The operation mechanism 50 includes an engagement member 51, a stopper member 56, and a biasing spring 59. The engagement member 51 shown in FIG. 4 has an approximately annular shape. The engagement member 51 includes a guide unit 52 and an engagement portion 53. The guide unit 52 guides the sliding of the engagement member 51. The guide unit 52 has a double structure such that a guide circumferential edge 311 protruding from a front end of the output side housing 31 is interposed between an outer side and an inner side thereof. The guide circumferential edge 311 has an approximately annular shape. Accordingly, the guide unit 52 has a double structure constituted by an outer circumferential ring 521 and an inner circumferential ring 522 that have an approximately annular shape. The outer circumferential ring 521 and the inner circumferential ring 522 are coupled with each other so as to be folded by a folding portion 523 on a front side. A joint 524 is provided in the vicinity of a rear end edge of the inner circumferential ring 522. A joint 57 of the stopper member 56, which will be described later, is coupled with the joint 524. In more detail, the joint 524 provided in the engagement member 51 has a female shape which is fitted to the male-shaped joint 57 provided on the stopper member 56. An inner circumferential surface on a front side of the inner circumferential ring 522 is formed as the engagement portion 53 described above. The engagement portion 53 can be engaged with an outer circumference of the nut member 47. That is, the engagement portion 53 has a hexagonal shape when viewed from the front and has an inner circumferential shape which corresponds to the outer circumference of the nut member 47. In more detail, the engagement portion 53 of the engagement member 51 has a shape representing the engagement shape of a spanner engaged with the outer circumference of the nut member 47. Accordingly, the engagement portion 53 has a hexagonal shape when viewed from the front, corresponding to the outer circumference of the nut member 47. When the engagement portion 53 is engaged with the outer circumference of the nut member 47, the nut member 47 can be screwed about the axis of rotation 100 (refer to FIG. 3) by the engagement member 51.

A rear end 525 of the outer circumferential ring 521 of the engagement member 51 and a front surface 312 of the output side housing 31 come into contact with each other by a biasing force of the biasing spring 59. Accordingly, it is possible to inhibit outside dust from entering an area where the built-in biasing spring 59 is located. Further, a protruding portion 526 that extends to an inner side in the radial direction is provided on an inner circumferential side of the inner circumferential ring 522 of the engagement member 51. The protruding portion 526 faces a front end surface of the stopper member 56. Accordingly, a gap between the front end surface of the stopper member 56 and the protruding portion 526 closes and the dust is prevented from entering through the gap.

The stopper member 56 also has an approximately annular shape. The stopper member 56 includes the joint 57 and an outer flange portion 581. The outer flange portion 581 can be in sliding contact with an inner circumferential surface of the output side housing 31. The outer flange portion 581 is a guide unit that guides the front-back sliding of the stopper member 56. This guide unit includes the engagement member 51 which is preferably in sliding contact with the inner circumferential surface of the output side housing 31. The joint 57 has a male shape that is fitted into the joint 524 provided in the engagement member 51. In other words, the joint 57 of the stopper member 56 is fitted into the joint 524 of the engagement member 51 and the stopper member 56 is coupled with the engagement member 51. In this manner, the stopper member 56 is integrated with the engagement member 51 and functions as a part of the engagement member 51. In other words, the stopper member 56 constitutes the engagement member according to an embodiment of the present invention. The outer flange portion 581 is placed on a rear side of the joint 57 and has an outer flange shape. The outer flange portion 581 also has a structure that holds the biasing spring 59. A rear end of the biasing spring 59 comes into contact with the outer flange portion 581. The biasing spring 59 is a coil spring, and corresponds to an elastic body according to an embodiment of the present invention. The biasing spring 59 is also held by the output side housing 31. Further, the biasing spring 59 is placed between the guide circumferential edge 311 of the output side housing 31 and the inner circumferential ring 522 of the engagement member 51. A front end of the biasing spring 59 comes into contact with an inner flange portion 582 of the output side housing 31. The inner flange portion 582 protrudes from the guide circumferential edge 311 towards the inner circumferential ring 522. The inner flange portion 582 corresponds to a protruding portion according to an embodiment of the present invention. A rear end of the biasing spring 59 also comes into contact with the outer flange portion 581 of the engagement member 51. In this manner, the biasing spring 59 biases both of the engagement member 51 and the stopper member 56 towards a rear side of the tool main body 11. Also, both of the ends of the biasing spring 59 come into contact with the inner flange portion 582 and the outer flange portion 581 in a slidable manner. Also, the biasing direction of the biasing spring 59 which constitutes a part of the operation mechanism 50 is located to be orthogonal to that of the biasing spring 38 which constitutes a part of the shaft lock mechanism 36.

The movement of both of the engagement member 51 and the stopper member 56 toward the rear side of the tool main body 11 by the biasing of the biasing spring 59 is stopped since the folding portion 523 of the engagement member 51 comes into contact with a front end of the guide circumferential edge 311. In other words, the position shown in FIG. 4 where the engagement member 51 is stopped is a retract position of the engagement member 51. The engagement member 51 at the retract position is not engaged with an outer circumferential surface of the nut member 47. In this way, the nut member 47 cannot be screwed. In contrast, although not shown herein, the engagement portion 53 of the engagement member 51 is engaged with the outer circumference of the nut member 47 when the engagement member 51 is moved forward. When the engagement portion 53 is engaged with the outer circumference of the nut member 47, the engagement member 51 is disposed at an engagement position. Unlike in the situation with the retract position, the engagement member 51 is relatively separated from the output side housing 31 at the engagement position. Between the retract position and the engagement position the engagement member 51 moves back and forth in the direction along the axis of rotation 100 of the nut member 47. That is, when compared to the retract position of the engagement member 51, the engagement position of the engagement member 51 is a position moved forward along the axis of rotation 100. The nut member 47 in engagement can be integrally rotated when the engagement member 51 that is disposed at the engagement position is rotated along the axis of rotation 100. In other words, the nut member 47 is relatively screwed with respect to the insertion member 41 by rotating the engagement member 51. This procedure may be used for a temporary joint of the bit B before the bit B is firmly affixed by use of a spanner.

Next, the shoe 70 that is attached to the output side housing 31 will be described. The shoe 70 is attached to a shoe attachment portion 60 provided in the output side housing 31. The shoe attachment portion 60 is provided with respect to the output side housing 31 which is placed on a right side of the output shaft 35. The shoe 70 is attached to the shoe attachment portion 60 in such a manner as to be slidable in the front-back direction with respect to the tool main body 11. The shoe 70 determines a relative position in the front-back direction with respect to the tool main body 11, which will be a protrusion amount of the bit B. Accordingly, the shoe 70 is attached to the shoe attachment portion 60 in such a manner as to be placed on a front side with respect to the tool main body 11.

As shown in FIG. 4, the shoe attachment portion 60 includes a guide plate 61 and a fastening screw member 66. The guide plate 61 is provided on a right side surface of the output side housing 31 so as to guide the front-back sliding of the shoe 70, which will be described later. The guide plate 61 includes a plate main body 62 and a screwing member 64.

The plate main body 62 includes an outer circumferential surface 621 with which an inner circumferential surface 811 of a shoe plate 81 of the shoe 70 (which will be described later) is in sliding contact. Accordingly, the outer circumferential surface 621 of the plate main body 62 has a shape corresponding to that of a circumferential surface shape of the inner circumferential surface 811 of the shoe plate 81. Also, as shown in FIGS. 1 and 2, slide guide units 622 and 622 are provided in the plate main body 62. The slide guide units 622 and 622 are provided at end edges (end edges of the tool main body 11 in the up-down direction) on both sides of the plate main body 62 in the width direction, and guide the front-back sliding of the shoe plate 81. In more detail, the slide guide units 622 and 622 have a rib shape protruding towards an outer side of the output shaft 35 in the radial direction. The slide guide units 622 and 622 that are formed in this manner are in sliding contact with both end edges 812 and 812 of the shoe plate 81 in the width direction (up-down direction). In other words, the slide guide units 622 and 622 are in sliding contact with both of the end edges 812 and 812 of the shoe plate 81 so as not to shift with respect to the shoe plate 81 in the width direction (up-down direction), and guide the front-back sliding of the shoe 70 in the front-back direction. The placement adjustment direction (front-back direction) of the shoe 70 is orthogonal to the direction (up-down direction) in which the rechargeable battery 15 is mounted.

A stop hole 63 is provided in a rear portion of the plate main body 62. The screwing member 64 is inserted through the stop hole 63. The screwing member 64, that is inserted through the step hole 63, is screwed to the output side housing 31 in order to combine the plate main body 62 with the output side housing 31. Accordingly, a female screw portion 641 that corresponds to the male screw shape of the screwing member 64 is provided in the output side housing 31. When the screwing member 64 is screwed and tightened to the female screw portion 641, the screwing member 64 pushes the vicinity of the stop hole 63 of the plate main body 62 and integrally affixes the plate main body 62 to the output side housing 31.

A fastening female screw portion 65 is provided in a front portion of the plate main body 62. A male screw portion 67 of the fastening screw member 66, which will be described later, is screwed to the fastening female screw portion 65. A flange portion 651 that appropriately protrudes to an outer side (right side) in the radial direction is provided in the fastening female screw portion 65. The flange portion 651 is set to be put into a slide guide groove 83 of the shoe plate 81. When put into the slide guide groove 83, the flange portion 651 guides the front-back sliding of the shoe 70 in the front-back direction.

The fastening screw member 66 includes the male screw portion 67, a knob portion 68, and a washer portion 69. The male screw portion 67 is screwed to the fastening female screw portion 65 that is provided in the plate main body 62 described above. The male screw portion 67 is linked to the knob portion 68. Accordingly, the male screw portion 67 is screwed along with the screwing of the knob portion 68. The knob portion 68 has a knob shape that can be rotated. The washer portion 69 is formed in a similar manner as a washer commonly used. The male screw portion 67 is inserted through the washer portion 69. By screwing the knob portion 68, the male screw portion 67 that is screwed to the fastening female screw portion 65 is moved in the left-right direction.

When the knob portion 68 is screwed in the fastening direction, the male screw portion 67 that is screwed to the fastening female screw portion 65 is moved in the left side direction. When the knob portion 68 is unscrewed in the unscrewing direction, the male screw portion 67 that is screwed to the fastening female screw portion 65 is moved to the right side direction. Herein, when the knob portion 68 is screwed in the fastening direction and the male screw portion 67 that is screwed to the fastening female screw portion 65 is moved in the left side direction and the knob portion 68 pushes the shoe plate 81 via the washer portion 69. In other words, the knob portion 68 interposes the shoe plate 81 of the shoe 70 with the plate main body 62 via the washer portion 69. The shoe plate 81 that is interposed in this manner is linked to the shoe attachment portion 60, and the shoe 70 is in a state where it is integrally affixed to the tool main body 11 (in a screw-fastened state) in which there is no relative movement. In contrast, when the knob portion 68 is unscrewed in the unscrewing direction and the male screw portion 67 that is screwed to the fastening female screw portion 65 is moved to the right side direction, the push of the shoe plate 81 by the knob portion 68 via the washer portion 69 is released. Accordingly, the male screw portion 67 that is inserted into the slide guide groove 83 can be moved according to the shape of the slide guide groove 83. In other words, the shoe 70 is in a slidingly displaceable state in which the relative position with respect to the tool main body 11 can be changed.

Next, the shoe 70 that is attached to the shoe attachment portion 60 will be described. The shoe 70 determines the relative position with respect to the tool main body 11 and is integrally fixed. It also sets the protrusion amount of the bit B which protrudes forward from the tool main body 11 for processing. The shoe 70 corresponds to a contact member according to an embodiment of the present invention.

Figure 5:
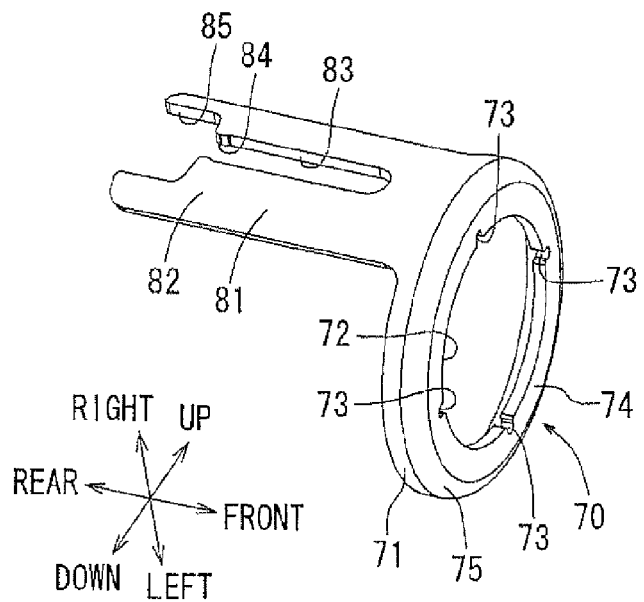
FIG. 5 is an external perspective view showing a shoe.
Figure 6:
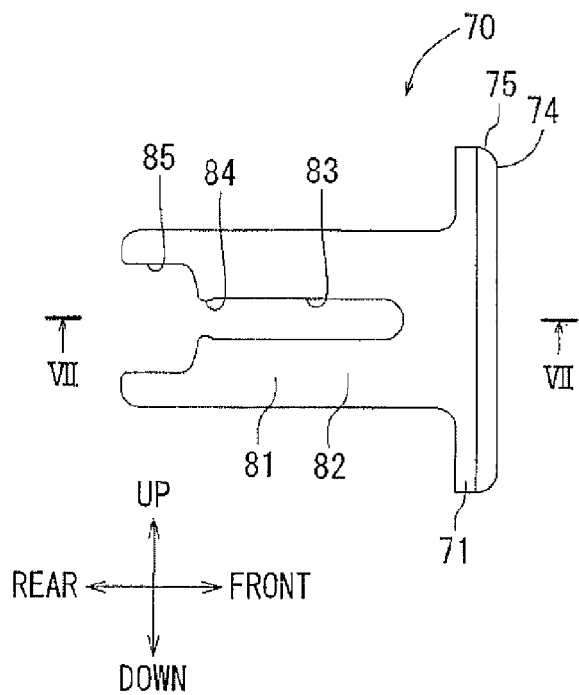
FIG. 6 is an external side view showing the shoe.
Figure 7:
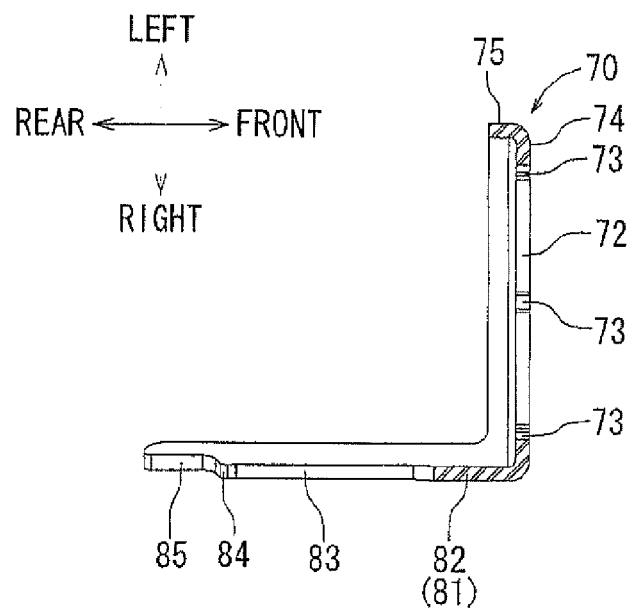
FIG. 7 is a cross-sectional view taken along line VII-VII of FIG. 6.
Figure 8:
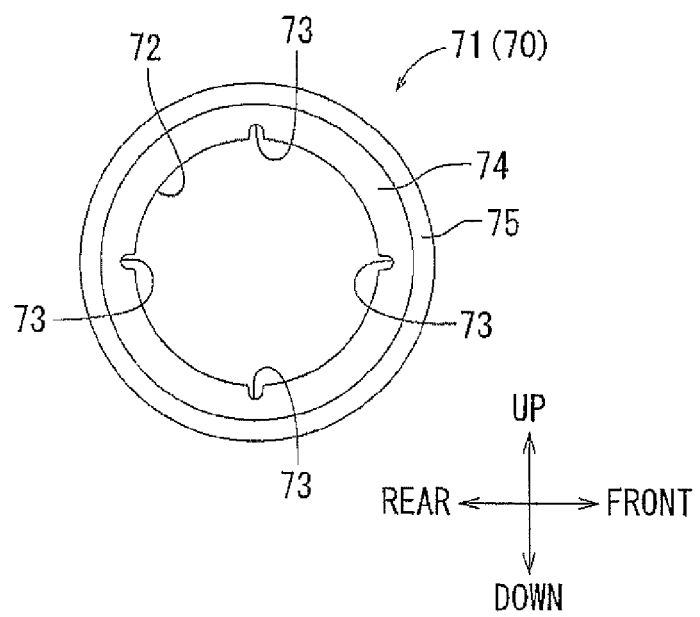
FIG. 8 is an external front view showing the shoe.

FIG. 5 is an external perspective view of the shoe 70. FIG. 6 is an external side view of the shoe 70. FIG. 7 is a cross-sectional view taken along line VII-VII of FIG. 6. FIG. 8 is an external view of the shoe 70 viewed from the front. As shown in FIGS. 5 to 8, the shoe 70 includes the shoe main body 71 and the shoe plate 81. The shoe main body 71 and the shoe plate 81 extend in directions crossing each other so that crossing ends are integrally coupled to each other. In more detail, the shoe main body 71 and the shoe plate 81 are placed in such a manner as to extend in the directions orthogonal to each other so that the crossing ends are integrated with each other. The shoe main body 71 and the shoe plate 81 that are placed in this manner are integrally molded to form the shoe 70. The shoe main body 71 is a portion that can be in contact with the workpiece. The shoe main body 71 corresponds to the contact portion according to an embodiment of the present invention.

As shown in FIG. 5, the shoe main body 71 has an approximately annular shape. The shoe main body 71 includes an opening 72 that is open to have an appropriate size so that the above-described bit B can be placed to protrude from an inner circumferential side. The bit B is supported in such a manner as to protrude forward from the opening 72 of the shoe main body 71. An outer circumferential side of the shoe main body 71 has a smooth circumferential shape. An inner circumferential edge of the opening 72 that also serves as an inner circumferential side of the shoe main body 71 has a smooth circumferential shape, and is provided with four positioning concave portions 73. As shown in the drawing, the four positioning concave portions 73 are provided at the up, down, left, and right positions, respectively. When the tool main body 11 is moved and processed by the bit B, the positioning concave portions 73 function as marks that can make the tool main body 11 easily move along an ink line which is drawn on the workpiece. A front end surface 74 of the shoe main body 71 has a flat surface shape so as to be capable of being in surface contact with the workpiece. The front end surface 74 of the shoe main body 71 is a surface that extends in the up-down and left-right directions that cross the front-back direction in which the tool main body 11 of the cutout tool 10 extends. An outer circumferential edge of the front end surface 74 is formed as a tapered surface 75. The tapered surface 75 has an R shape that is inclined to a rear side toward an outer side. The tapered surface 75 is advantageous when a ruler is laid along an outside circumference of the shoe main body 71 for an operation and is slid along the outer circumference.

The shoe plate 81 is attached to the shoe attachment portion 60. The shoe plate 81 includes a plate body 82 that extends rearward from a right end portion of the shoe main body 71 as described above. The plate body 82 has a shape that can be in sliding contact with the outer circumferential surface 621 of the plate main body 62 of the shoe attachment portion 60. The slide guide groove 83 is provided in the plate body 82 so that the shoe 70 can be slid in the front-back direction. The slide guide groove 83 has an approximately long hole shape that extends in the front-back direction. As shown in the drawing, the slide guide groove 83 has a communicating shape through which the male screw portion 67 of the fastening screw member 66 is inserted. In more detail, the slide guide groove 83 is formed as a closed end 831 whose front end is closed and is formed as an open end 832 whose rear end is open. A convex-shaped portion 84 is provided at the open end 832 of the slide guide groove 83. The convex-shaped portion 84 is shaped in such a manner as to protrude to an inner side.

A spanner portion 85 is provided in a rear portion of the plate body 82. The spanner portion 85 is provided at a rear end side which is opposite to a front end side on which the shoe main body 71 of the shoe 70 is provided. The spanner portion 85 has an approximately spanner shape. The spanner portion 85 has a shape just like an engagement shape of a spanner which is engaged with the outer circumference of the nut member 47. Accordingly, the spanner portion 85 has the shape of a spanner that can be engaged with a hexagon as viewed from the front corresponding to the outer circumference of the nut member 47. In the plate body 82 which includes the spanner portion 85, strength is ensured so as to function as the spanner portion 85 through quenching. The shoe 70 is configured in such a manner as to enable an operation with regard to the holding of the bit B with respect to the bit attachment mechanism 40. The spanner portion 85 is connected to the open end 832 of the slide guide groove 83 described above. Accordingly, in a case where the shoe 70 is in a slidingly displaceable state, the male screw portion 67 inserted into the slide guide groove 83 can be moved from the open end 832 at a rear end of the slide guide groove 83 to the spanner portion 85 and can be removed outside from the spanner portion 85. In other words, the shoe 70 can be separated from the shoe attachment portion 60.

When the pushing of the shoe plate 81 of the knob portion 68 via the washer portion 69 is released by unscrewing the knob portion 68 in the unscrewing direction, the male screw portion 67 that is inserted into the slide guide groove 83 can be moved according to the shape of the slide guide groove 83. In other words, the shoe 70 is in a slidingly displaceable state and can be slid with respect to the tool main body 11. In the slidingly displaceable state, the shoe 70 is moved to a front side with respect to the tool main body 11. Then, the male screw portion 67 that is inserted into the slide guide groove 83 is placed in the spanner portion 85 from the open end 832 at the rear end of the slide guide groove 83 and can be further removed outside from the spanner portion 85. In other words, the shoe 70 is separated from the shoe attachment portion 60. The shoe 70 that is separated in this manner can function as a spanner which is separated from the tool main body 11. In other words, the spanner portion 85 of the shoe 70 can be engaged with the outer circumference of the nut member 47 to be used as a spanner. The shoe 70 in which the spanner portion 85 is engaged with the outer circumference of the nut member 47 can screw the nut member 47 along the axis of rotation 100 (refer to FIG. 3). The shoe 70 that is screwed in this manner can be used as a spanner which loosens or tightens the bit B with the bit attachment mechanism 40. In other words, the shoe 70 is a member that has two functions; one being the original function of a shoe and the other being the function as a spanner which is different from the original function. The shoe 70 is attached to the output side housing 31 and is indirectly held by the motor housing 21. The shoe 70 is configured in such a manner as to enable the operation with regard to the holding of the bit B with respect to the bit attachment mechanism 40.

When the shoe 70 is moved to a rear side with respect to the tool main body 11 in the slidingly displaceable state as described above, the male screw portion 67 inserted into the slide guide groove 83 comes into contact with the closed end 831 at a front end of the slide guide groove 83. Then, the movement of the shoe plate 81 with respect to the shoe attachment portion 60 is inhibited. In a situation where the knob portion 68 is in a screw-fastened state by being screwed in the fastening direction, the knob portion 68 pushes the shoe plate 81 via the washer portion 69 and the relative position of the shoe 70 with respect to the tool main body 11 cannot be changed.

The following effects can be achieved with the cutout tool 10 according to the above-described embodiment. According to the cutout tool 10 as described above, the shoe 70 that is attached to the shoe attachment portion 60 includes the spanner portion 85. Since the shoe 70 can be separated from the tool main body 11, the shoe 70 can be used as a spanner (tool). In other words, the shoe 70 can function as a spanner that operates the bit attachment mechanism 40 to replace the bit B. In addition, the shoe 70 has the original function of a shoe that can adjust a protrusion amount of the bit B. Since the shoe 70 is attached to the shoe attachment portion 60 and held by the tool main body 11, a spanner can be prepared to be ready for use with the cutout tool 10. Accordingly, the spanner that is required to replace the bit B can be prepared to be ready for use without having to increase the number of components that the cutout tool 10 is equipped with, and thus the management burden on a user can be reduced. Also, according to the cutout tool 10 as described above, the shoe 70 includes the spanner portion 85 and enables the operation with regard to the holding of the bit B with respect to the bit attachment mechanism 40. Accordingly, the shoe 70 has the two functions: one being the function of being in contact with the workpiece in the shoe main body 71 and the other being the function of operating the bit attachment mechanism 40 with regard to the holding of the bit B. Accordingly, a member that has the function as the spanner operating the bit attachment mechanism 40 during the replacement of the bit B can be set as a member of the cutout tool 10 which has the function of being in contact with the workpiece in the shoe main body 71. Accordingly, the member that has the function as a tool for replacing the bit B can become a member that functions as a part of the cutout tool 10, and the spanner management burden can be reduced.

According to the cutout tool 10 as described above, the shoe 70 is provided with the spanner portion 85 so as to rotate the nut member 47. Herein, the affixing or releasing of the bit B is performed by the relative rotation operation of the nut member 47 with respect to the output shaft 35. The nut member 47 can be rotated by the shoe 70 when the fixing of the bit B with respect to the output shaft 35 is completed. Accordingly, the shoe 70 equipped in the cutout tool 10 can have the function of the spanner for replacing the bit B and thus the management burden for a spanner can be reduced. Also, according to the cutout tool 10 as described above, the spanner portion 85 is provided on a rear end side which is opposite to a front end side of the shoe 70 where the shoe main body 71 is provided and thus the shapes of the shoe main body 71 and the spanner portion 85 can be provided without mutual interference. Accordingly, the shoe main body 71 can be fully designed to serve as the original function and also the spanner portion 85 can be fully designed to serve as a spanner. Also, according to the cutout tool 10 as described above, since the shoe main body 71 includes the front end surface 74 that extends in the direction crossing the front-back direction of the cutout tool 10, the front end surface 74 of the shoe main body 71 can be in surface contact with the workpiece by moving the cutout tool 10 forward. In this manner, the shoe main body 71 can be in contact with the workpiece in a stable manner. The shoe main body 71 provided in this manner can also serve as a handgrip portion during the use of the spanner portion 85.

Figure 9:
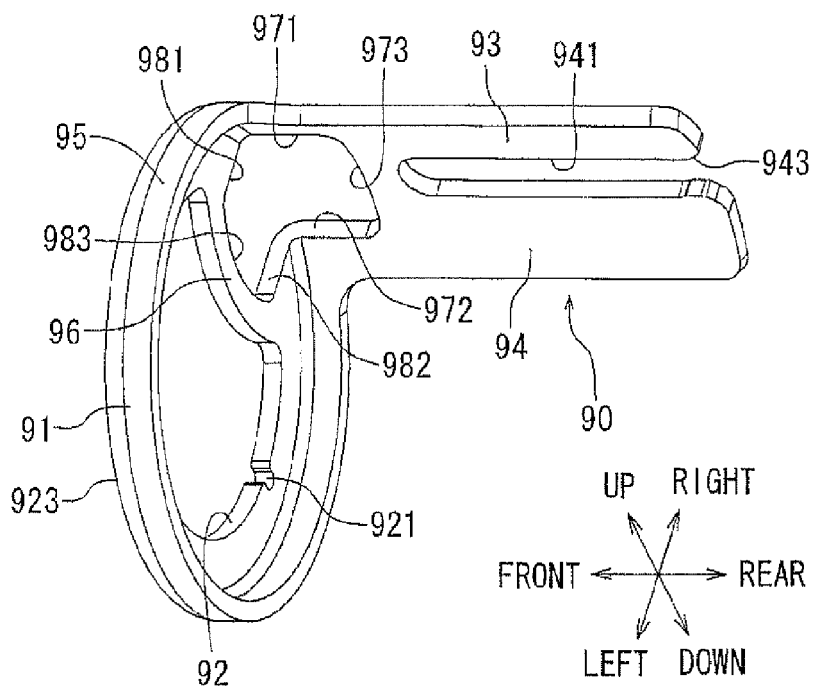
FIG. 9 is an external perspective view showing a shoe according to a modified example.
Figure 10:
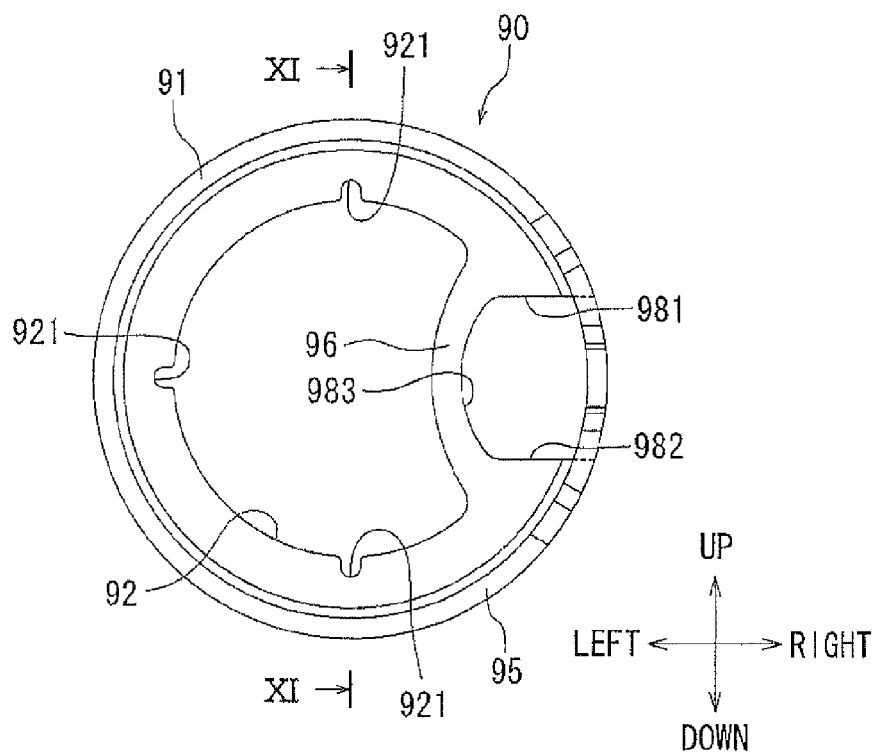
FIG. 10 is an external rear view showing the shoe according to the modified example.
Figure 11:
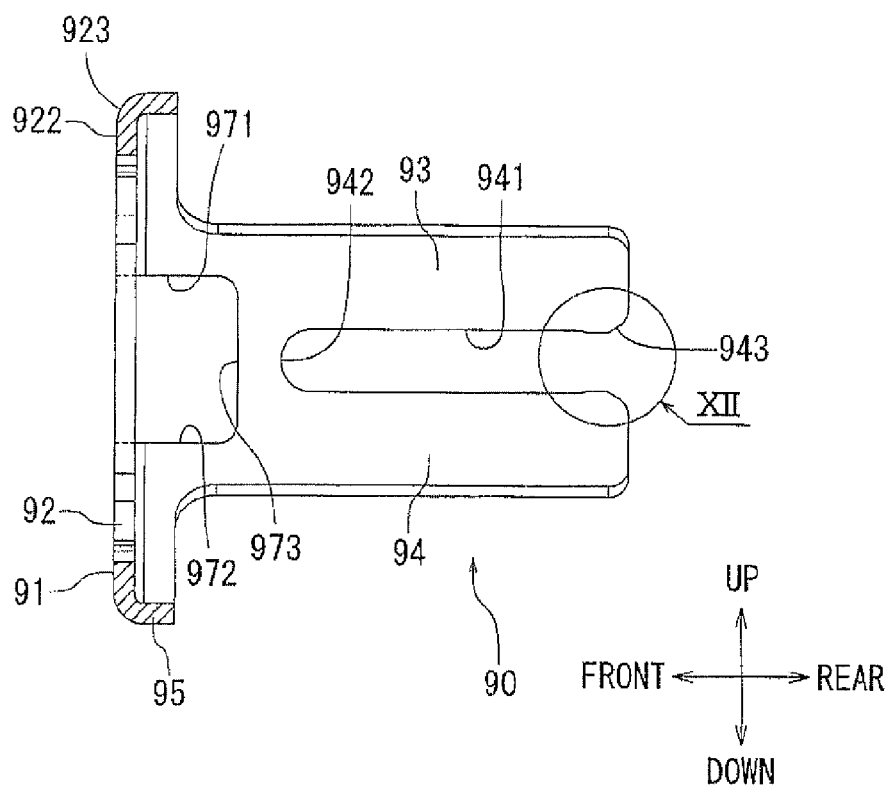
FIG. 11 is a cross-sectional view taken along line XI-XI of FIG. 10.
Figure 12:
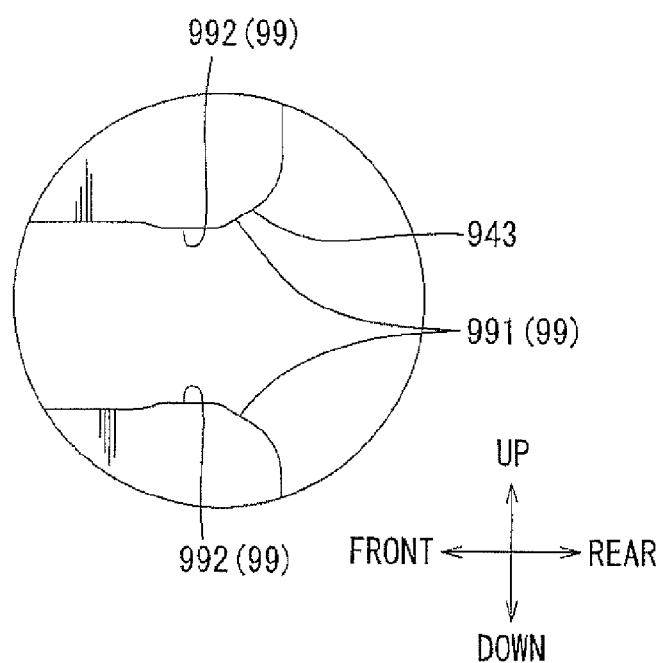
FIG. 12 is an enlarged view of an engagement portion shown in the circle of FIG. 11.

Next, a shoe 90 that is a modified example of the above-described shoe 70 will be described referring to FIGS. 9 to 12. FIG. 9 is an external perspective view showing the shoe 90 according to the modified example. FIG. 10 is an external rear view showing the shoe 90 according to the modified example. FIG. 11 is a cross-sectional view taken along line XI-XI of FIG. 10. FIG. 12 is an enlarged view of an engagement portion shown in the circle (XII) of FIG. 11.

The shoe 90 shown in FIGS. 9 to 12 can be used as an alternate shoe of the shoe 70 according to the above-described embodiment. In other words, the shoe 70 can be separated from the shoe attachment portion 60 of the above-described embodiment and can be replaced with the shoe 90 in the shoe attachment portion 60. The shoe 90 also determines the relative position with respect to the tool main body 11 and is fixed thereto, and a protrusion amount of the bit B protruding forward from the tool main body 11 is determined for processing. The shoe 90 also corresponds to the contact member according to an embodiment of the present invention. The shoe 90 includes a shoe main body 91 and a shoe plate 93. The shoe main body 91 and the shoe plate 93 extend in directions orthogonal to each other so that crossing ends are integrally coupled to each other. In more detail, the shoe main body 91 and the shoe plate 93 are placed in such a manner as to extend in directions crossing each other so that the crossing ends are integrated with each other. The shoe main body 91 and the shoe plate 93 that are placed in this manner are integrally molded to form the shoe 90. The shoe main body 91 is a portion that can be in contact with the workpiece. The shoe main body 91 corresponds to the contact portion according to an embodiment of the present invention.

As shown in FIG. 9, the shoe main body 91 has an approximately annular shape. The shoe main body 91 includes an opening 92 that is open to have an appropriate size so that the above-described bit B can be placed to protrude from an inner circumferential side. The bit B is supported in such a manner as to protrude forward from the opening 92 of the shoe main body 91. An outer circumferential side of the shoe main body 91 has a smooth circumferential shape. Further, as shown in FIG. 10, an inner circumferential edge of the opening 92 that is an inner circumferential side of the shoe main body 91 is provided with three positioning concave portions 921. The three positioning concave portions 921 are arranged at the up, the down, and the left positions excluding the side on which the shoe plate 93 is arranged. The positioning concave portions 921 functions as marks that makes the tool main body 11 easy to move along an ink line which is drawn on the workpiece when the tool main body 11 is moved and processed by the bit B. A front end surface 922 of the shoe main body 91 has a flat surface shape so as to be capable of being in surface contact with the workpiece. The front end surface 922 of the shoe main body 91 is a surface that extends in the up-down and left-right directions that cross the front-back direction in which the tool main body 11 forming the cutout tool 10 extends. An outer circumferential edge of the front end surface 922 is formed as a tapered surface 923. The tapered surface 923 has an R shape that is inclined to a rear side toward an outer side. The tapered surface 923 is advantageous when a ruler is laid along an outside circumference of the shoe main body 91 for an operation and is slid along the outer circumference.

The shoe plate 93 is attached to the above-described shoe attachment portion 60. When the shoe plate 93 is attached to the shoe attachment portion 60, the shoe 90 is attached to the tool main body 11. The shoe plate 93 includes a plate body 94 that extends rearward from a right end portion of the above-described shoe main body 91. The plate body 94 has a shape that can be in sliding contact with the outer circumferential surface 621 of the plate main body 62 of the shoe attachment portion 60. A slide guide groove 941 is provided in the plate body 94 so that the shoe 90 can be slid in the front-back direction. The slide guide groove 941 has an approximately long hole shape that extends in the front-back direction. The slide guide groove 941 has a communicating shape through which the male screw portion 67 of the above-described fastening screw member 66 is inserted. In more detail, the slide guide groove 941 is formed with a front closed end 942 and a rear open end 943. A third engagement portion 99, which will be described later, is provided at the open end 943 of the slide guide groove 941.

Engagement portions 97, 98, and 99 are provided at three positions in the shoe 90 so as to function in the same manner as the spanner portion 85 of the above-described shoe 70. The first engagement portion 97 is provided at a front end portion of the shoe plate 93, the second engagement portion 98 is provided in the shoe main body 91, and the third engagement portion 99 is provided at a rear end portion of the shoe plate 93. The first engagement portion 97, the second engagement portion 98, and the third engagement portion 99 are shaped in such a manner as to have the same function as the above-described spanner portion 85.

First, the first engagement portion 97 will be described. As shown in FIGS. 9 and 11, the first engagement portion 97 is provided, by cutting out a front end of the shoe plate 93. This is accomplished by cutting out a front end of the plate body 94. The first engagement portion 97 is provided in a central portion at the front end of the plate body 94. This is accomplished by cutting out the shoe plate 93 from a right end of an outer circumferential edge 95 of the shoe main body 91 as in the following description of the second engagement portion 98. The first engagement portion 97 is formed to have an approximately U-shaped cutout shape whose front side is open. In the first engagement portion 97, opposite edges 971 and 972 are provided to face each other. The opposite edges 971 and 972 extend along the front-back direction. Accordingly, the opposite edges 971 and 972 are provided such that they are parallel with each other. Rear end portions of the opposite edges 971 and 972 are connected to each other by a connecting edge 973. The connecting edge 973 extends in the up-down direction to orthogonally cross opposite edges 971 and 972. In contrast, front end portions of opposite edges 971 and 972 form an opening with inner circumferential sides being separated from each other. The outer circumferential sides, however, are supported by the outer circumferential edge 95 (portion where the tapered surface 923 is formed) of the above-described shoe main body 91. In other words, in the outer circumferential edge 95 of the shoe main body 91, the front end open portions of the opposite edges 971 and 972 extend in the opening direction. Accordingly, the front end open portions of the opposite edges 971 and 972 extend in the opening direction in the outer circumferential edge 95 of the shoe main body 91 that supports the front end open portions of the opposite edges 971 and 972. In this way, the expansion of the front end open portions of the opposite edges 971 and 972 in the opening direction is limited. The opposite edges 971 and 972 formed in this manner function approximately in the same manner as the above-described spanner portion 85. The opposite edges 971 and 972 are set such that they may engage a hexagon as viewed from the front. Such a hexagon would correspond to the outer circumference of a nut member 47. Also, the strength of the opposite edges 971 and 972 can be ensured through quenching.

Next, the second engagement portion 98 will be described. As shown in FIGS. 9 and 10, the second engagement portion 98 is provided by cutting out the right end of the outer circumferential edge 95 of the shoe main body 91. The second engagement portion 98 is provided such that it continues towards the open shape of the above-described first engagement portion 97 and protrudes to the inner circumferential side of the shoe main body 91. The second engagement portion 98 is formed to have an approximately U-shaped cutout shape whose right side is open as shown in FIG. 10 and appears in approximately the same manner as the above-described first engagement portion 97. In the second engagement portion 98, opposite edges 981 and 982 are provided facing each other. The opposite edges 981 and 982 extend along the left-right direction. Accordingly, the opposite edges 981 and 982 are provided such that they are aligned parallel to each other. Left end portions of opposite edges 981 and 982 are connected to each other by a connecting edge 983. The connecting edge 983 is formed by an outer circumferential portion of a connecting bridge portion 96. The connecting bridge portion 96 is provided in the opening 92 of the shoe main body 91. The connecting bridge portion 96 is formed to slightly protrude towards the inner circumferential side of the opening 92 and to bridge over opposite edges 981 and 982. As shown in FIG. 10, the connecting bridge portion 96 is formed to have an arc shape to form a convexity towards the inner circumferential side of the opening 92. The connecting edge 983 extends in the up-down direction to orthogonally cross opposite edges 981 and 982 while forming an arc. In other words, the connecting bridge portion 96 extends along the opening direction in the left end portion between the opposite edges 981 and 982. Accordingly, the connecting bridge portion 96 supports the left end portions of the opposite edges 981 and 982 so that the expansion of the left end portions of the opposite edges 981 and 982 in the opening direction is limited. Further, since the connecting bridge portion 96 provided on the left end portions of the opposite edges 981 and 982 is formed to have an arc shape, a force applied to the opening direction in the rear end portions of the opposite edges 981 and 982 can be distributed such that the left end portions of the opposite edges 981 and 982 can be efficiently supported. In contrast, at the right end portions of the opposite edges 981 and 982, opposite sides are separated from each other and are open, and an outer side is supported by the outer circumferential edge 95 (portion where the tapered surface 923 is formed) of the above-described shoe main body 91. In other words, the outer circumferential edge 95 of the shoe main body 91 extends in the opening direction of the right end open portion between the opposite edges 981 and 982. Accordingly, the outer circumferential edge 95 of the shoe main body 91 supports the right end open portions of the opposite edges 981 and 982 so that the expansion of the right end open portions of the opposite edges 981 and 982 in the opening direction is limited. The opposite edges 981 and 982 formed in this manner function approximately in the same manner as the above-described spanner portion 85. The opposite edges 981 and 982 are capable of being engaged with a hexagon viewed from the front corresponding to the outer circumference of the nut member 47. Also, strength of the opposite edges 981 and 982 can be ensured through quenching.

Next, the third engagement portion 99 will be described. As shown in FIG. 12, the third engagement portion 99 is provided at the open end 943 of a rear end of the slide guide groove 941. The third engagement portion 99 is formed with engaging inclined surfaces 991 and 991 that face each other. As shown in the drawing, the engaging inclined surfaces 991 and 991 that are placed to face each other in this manner are fainted to have inclined surfaces, between which a gap (width of separation in the up-down direction) is widens from a front side toward a rear side. Accordingly, the engaging inclined surfaces 991 and 991 are configured to extend along the direction crossing the front-back direction. On front end sides of the engaging inclined surfaces 991 and 991 whose rear end sides are open, protruding flat surface portions 992 and 992 which protrude to an inner circumferential side are provided. The protruding flat surface portions 992 and 992 are formed to have a flat surface shape and they face each other. The protruding flat surface portions 992 and 992 are formed to protrude to an inner circumferential side of the slide guide groove 941 to approach each other. An angle at which the engaging inclined surfaces 991 and 991 are open is configured to be capable of being engaged with a hexagon viewed from the front. This hexagon corresponds to the outer circumference of the nut member 47. The engaging inclined surfaces 991 and 992 formed in this manner function approximately in the same manner as the above-described spanner portion 85. That is, the engaging inclined surfaces 991 and 992 are configured to be capable of engaging a hexagon viewed from the front corresponding to the outer circumference of the nut member 47. In more detail, the angle at which the engaging inclined surfaces 991 and 991 are open conforms to one angle of a hexagon viewed from the front of the nut member 47. Front ends of the engaging inclined surfaces 991 and 991 whose opening angles are configured in this manner have a narrowed opening width in the above-described protruding flat surface portions 992 and 992 such that the engagement of the nut member 47 can be assuredly performed. Also, the strength of the engaging inclined surfaces 991 and 991 can be ensured through quenching.

The shoe 90 is configured in such a manner as to enable the operation with regards to the holding of the bit B with respect to the bit attachment mechanism 40. The first engagement portion 97, the second engagement portion 98, and the third engagement portion 99 provided in the shoe 90 can function in the same manner as the spanner portion 85 described above. Herein, the slide guide groove 941 of the shoe 90 is provided with an open end 943 at the rear end so that the male screw portion 67 inserted into the slide guide groove 941 can be moved from the open end 943 at the rear end of the slide guide groove 941 to the spanner portion 85 and be further removed out of the spanner portion 85. In other words, the shoe 90 can be separated from the shoe attachment portion 60. Even in the situation where the shoe 70 is separated from the shoe attachment portion 60 of the above-described embodiment to be replaced by the shoe 90 shown in FIGS. 9 to 12, the same effect as the cutout tool 10 on which the above-described shoe 70 is mounted can be achieved.

The above-described embodiment is an example of an electric power tool referred to as the so-called cutout tool (dust-proof board trimmer) 10. However, the electric power tool according to the present invention is not limited to the configuration of the above-described cutout tool 10 but may be configured as an appropriate electric power tool such as a reciprocating saw. Also, appropriate modifications may be added to the configuration of the electric power tool such as the cutout tool 10.

The electric rotary tool according to the present invention may have the following configuration. The electric rotary tool according to the present invention may be applied to a so-called circular saw (fixed circular saw or a portable circular saw). The shoe 70 equipped in the cutout tool 10 according to the above-described embodiment may be applied to a parallel ruler equipped in such circular saws. The parallel ruler corresponds to the contact member according to the present invention. The parallel ruler, as is the case with parallel rulers of circular saws in general, includes a material surface contact portion that is in contact with a front surface of the workpiece from below an electric motor. In a state where the material surface contact portion is in contact with the front surface of the workpiece, the parallel ruler includes a material side-surface contact portion which is in contact with a side surface of the workpiece. The material surface contact portion corresponds to a first contact portion according to an embodiment of the present invention. The material side surface contact portion corresponds to a second contact portion according to an embodiment of the present invention. Herein, it is preferable that the spanner portion 85 provided in the shoe 70 according to the above-described embodiment be provided in the material side-surface contact portion, which will not interfere with an original function of the parallel ruler. In a case where the spanner portion is provided in the material side surface contact portion, the function as the material surface contact portion can be sufficiently ensured and the burden of managing a spanner can be reduced.

The spanner portion 85 that functions as the spanner is not limited to the use during the operation of the bit attachment mechanism 40, and it can be used with respect to other types of nuts.

The shoe 70 according to the above-described embodiment is configured to have the two functions; that is, the function as the shoe and the function as the spanner. However, additional functions other than these functions may be added to the shoe 70. Such examples may include: the function as a wrench such as a hexagonal wrench, the function as a flat-bladed screwdriver, or the function as a Phillips head screwdriver may be provided. Also, the function as a hook may be provided.

The shoe 70 according to the above-described embodiment is mounted on the output side housing 31 to be indirectly held by the motor housing 21. However, the shoe 70 is not limited thereto but may be directly held by the motor housing 21.

Two different functions according to an embodiment of the present invention are not limited to the above-described example, and at least two different functions may be served appropriately in a combined manner. From the point of view of convenience, it is preferable that at least two different functions according to an embodiment of the present invention be the two functions, that is, the function as the electric power tool and the function as a required tool, which are combined together in one member. These functions may be integrated in one member, and any configuration such as the molding and connection can be adopted.

We claim:

1. An electric power tool comprising:
a motor;
a housing that accommodates the motor;
a tool tip holding unit that is driven by the motor and is configured to hold a tool tip, the tool tip holding unit including a nut that attaches the tool tip to the tool tip holding unit; and
a contact member that is removably attached to the housing, the contact member including (i) a contact portion having an opening through which the tool tip extends and (ii) a plate portion extended from the contact portion, the plate portion extending in a longitudinal direction of the tool tip, the plate portion having a spanner portion corresponding to an outer shape of the nut;
wherein the contact portion is configured to come into contact with a workpiece when the contact member is attached to the housing, and
the spanner portion is configured to rotate the nut to attach and detach the tool tip to and from the tool tip holding unit when the contact member is removed from the housing.

2. The electric power tool according to claim 1, further comprising:
an output shaft that is driven by the motor;
wherein the nut rotates with respect to the output shaft.

3. The electric power tool according to claim 1, wherein the spanner portion is located on a rear end side that is opposite a front end side where the contact portion of the contact member is provided.

4. The electric power tool according to claim 3, wherein the contact portion includes a surface that extends in a direction perpendicular to a longitudinal direction of the electric power tool.

5. The electric power tool according to claim 1, wherein the contact portion includes a surface that extends in a direction perpendicular to a longitudinal direction of the electric power tool.

6. The electric power tool according to claim 1, wherein the spanner portion is located both on a rear end side opposite to a front end side where the contact portion is provided and the front end side.

7. The electric power tool according to claim 1, wherein the housing includes a battery mounting unit, and a battery is detachably mounted on the battery mounting unit.

8. The electric power tool according to claim 1, wherein the plate portion includes a slide guide groove along which the contact member slides with respect to the housing, the slide guide groove extending from the spanner portion.

9. The electric power tool according to claim 8, wherein the plate portion includes a convex-shaped portion that is located between the slide guide groove and the spanner portion.

* * * * *